United States Patent [15] 3,673,681
Steranko [45] July 4, 1972

[54] ELECTRICAL CIRCUIT BOARD WIRING

[72] Inventor: James J. Steranko, Weston, Mass.
[73] Assignee: Inforex, Inc., Waltham, Mass.

[22] Filed: April 1, 1969
[21] Appl. No.: 812,022

[52] U.S. Cl. ....................29/626, 29/628, 29/502, 29/471.1, 219/85, 219/119, 228/5, 228/13, 228/51, 317/101
[51] Int. Cl. ....................H05k 3/30
[58] Field of Search ....................29/624–630, 502, 29/471.1; 228/3, 4, 51–55; 219/119, 85

[56] References Cited

UNITED STATES PATENTS

| | | | |
|---|---|---|---|
| 1,152,043 | 8/1915 | Orme | 228/52 |
| 3,229,885 | 1/1966 | Hurley | 228/52 |
| 3,315,711 | 4/1967 | Allen | 228/51 X |
| 3,252,645 | 5/1966 | Toltai | 228/52 |
| 3,353,263 | 11/1967 | Helons | 29/628 X |
| 3,358,897 | 12/1967 | Christianson | 228/54 |
| 3,384,958 | 5/1968 | Christian et al | 29/628 |
| 3,448,431 | 6/1969 | Adrien | 29/628 |
| 3,505,493 | 4/1970 | Helms et al. | 29/626 UX |
| 3,516,156 | 6/1970 | Steranko | 29/626 X |
| 3,119,006 | 1/1964 | Faulconer | 219/85 |
| 3,263,059 | 7/1966 | Rzant | 219/119 X |
| 3,535,769 | 10/1970 | Goldschmid | 29/498 X |

OTHER PUBLICATIONS

IBM Tech. Disclosure Bulletin- Bolda et al.- Welding Through Insulation title- Vol. 8, No. 8, January 1966- p. 1,167.

*Primary Examiner*—John F. Campbell
*Assistant Examiner*—Robert W. Church
*Attorney*—Woodcock, Washburn, Kurtz & Mackiewicz

[57] ABSTRACT

In the wiring of an electrical circuit on a circuit board having solder pads suitable for connection to circuit components, insulated wire passes through a solder tip which is moved relative to the position of the board. A portion of the wire extending from the head successively contacts the pads to which a wire connection is to be made. The application of heat to the insulated wire and the pad with which the tip is in contact sublimate the insulation on the wire and reflow solders the wire to the pad.

4 Claims, 9 Drawing Figures

ELECTRICAL CIRCUIT BOARD WIRING

BACKGROUND OF THE INVENTION

This invention relates to methods of and apparatus for wiring an electrical circuit on a circuit board and more particularly to bonding an insulated wire to pads on the circuit board for connection of circuit components.

State of the art fabrication of electrical circuits includes printed circuit techniques and the wire wrap process. While printed circuit boards have been used for a number of years, the complexity of connections often makes single-sided printed circuit boards unsuitable for use. There are many instances where one electrical conductor must physically cross another conductor without electrical contact. Of course, this cannot be done on a single-layer printed circuit board.

Therefore, double-layer and multi-layer printed circuit boards have been used where necessary. The fabrication of multi-layer printed circuit boards is costly. The cost of the masters is high, and each time there is a change in the electrical circuit the master must be changed. Close tolerance must be maintained not only of the masters but of the drilled holes in the various substrates. For instance, depending upon the number of layers utilized, the number of plated through holes required in a multi-layer printed circuit board is from three to six times the number of normal input/output pins or pads. The reason for this is that normally the electrical connections are run in one direction on one layer and in a perpendicular direction on another layer. When a wire must travel perpendicular to the direction of wiring on a particular plane, it passes through a plated through hole to the next layer. An increase in the number of plated through holes decreases the size of the grid system. As a result, more layers are required and normally the number of plated through holes goes up again and the grid size is again decreased.

All of these factors increase the cost of tooling required to produce a printed circuit board and also decrease the yield of good boards. The cost of the board increases with each of the latter factors.

Another approach to the problem of fabricating overlapping conductors is the wire wrap process. This includes the hand-wire wrap, the semi-automatic wire wrap processes, and the numerically controlled machines for wire wrapping. The latter include commercially available Gardner Denver Machines available from that company. High quality, close tolerance pins are located on the printed circuit board. Insulated wire is cut to the length necessary for making a connection between two of these pins. Insulation is stripped from both ends of the wire and the bare ends are wrapped around the pins. Automatic wire wrap machines are expensive, circuit boards with close tolerance pins thereon are expensive and the cost of labor for skilled personnel to operate and maintain the machine is expensive.

As will be subsequently apparent, the invention of this application provides decided economic advantages over the processes just described.

SUMMARY OF THE INVENTION

In accordance with an important aspect of this invention, electrical circuits are interwired by a bonding tip which has insulted wire threaded through an opening therein.

In one embodiment, a circuit board is mounted on a table and provision is made for relative movement between the table and a soldering head on which the tip is mounted. This movement is such that the head can be moved from pad to pad on the board and such that the tip can be moved into contact with a tin lead coated pad on the board. The tip of the solder head is pulsed to heat it. The heat sublimates the insulation on that portion of the wire which extends from the tip and reflow solders the wire into the tin lead bonding pad beneath it. At the same time, the remaining portion of the wire in the head is cooled so that the insulation is sublimated only from that portion of the wire which extends from the head.

After soldering the wire to one pad, the tip is separated from that pad allowing the wire to thread through it. The board and head are moved relative to one another until the bonding tip is over the next pad to which the wire is to be secured. The above process is repeated again reflow soldering the wire to the desired pad. This process continues until all of the pads which are to be connected together are soldered to the piece of wire. This process proceeds in a manner somewhat analogous to the manner in which a piece of thread is stitched at various points on cloth. The wire is severed at the end of each circuit net by using a cutter attachment on the head.

In accordance with another important aspect of the present invention, the circuit boards used are universal. That is, the same board is used for every circuit so that tooling cost for producing the board is depreciated over large quantities.

It can be shown that the technique of this invention can apply a wire to a circuit board approximately seven times cheaper than state of the art automatic wire wrap machines. Accordingly, it is an important object of the present invention to interwire electrical components on circuit boards more quickly, economically and with greater flexibility than prior art techniques.

With regard to flexibility, an important consideration is that a new product which has a large quantity of solid state circuitry in it is first designed and built, and before all of the errors are taken out of the system, every electrical connection in the product is changed at least once on an average. Because of this, in building a system of any complexity from multi-layer printed circuit boards, a long time is required to change and rechange the masters which make the printed circuit boards. The present invention has a decided advantage over printed circuit boards in allowing changes in the connections on each circuit board which is wired in this manner. Accordingly, it is another object of the present invention to manufacture a circuit board quickly and to make changes in the circuit quickly.

It is another object of the present invention to provide an interwiring process for large scale interconnection of integrated circuits.

It is another object of the invention to produce a circuit board interwired with insulated wire and which can then be wave soldered to attach components to the boards.

It is another object of the present invention to enchance the soldering technique by thermal insulation of the bonding pads.

The foregoing and other objects, features and advantages of the invention will be better understood from the following more detailed description in conjunction with the claims.

DESCRIPTION OF A PARTICULAR EMBODIMENT

Figure 1:
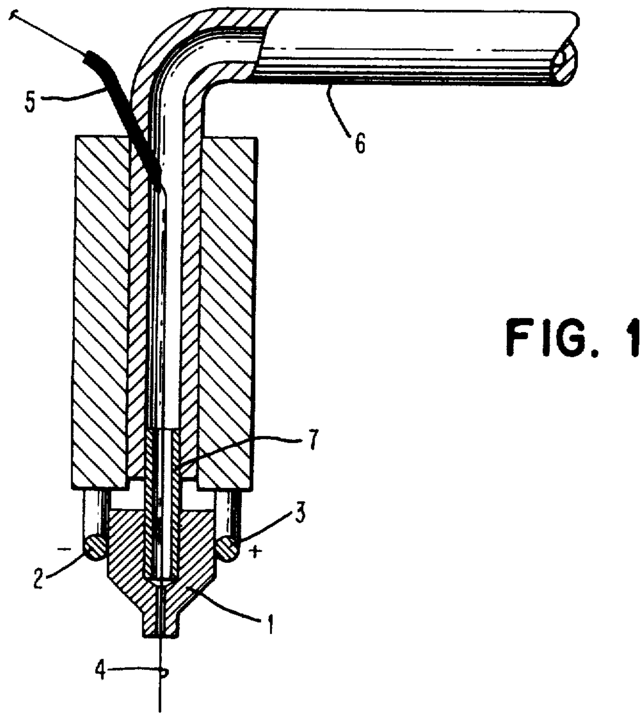
FIG. 1 shows the solder head of the present invention.

Referring to FIG. 1, the solder head includes the tip 1 supported between supports 2 and 3. These provide the electrical connections to the tip and support the tip in a manner such that it is thermally insulated from the remainder of the head as much as possible. The tip 1 is a tungsten soldering tip which is shaped to concentrate the heat in the very end. The end of the tip has an opening therein through which insulated wire 4 extends. In a preferred embodiment of the invention, the wire is 0.0022 inch diameter copper wire coated with a 1/10 mil thick layer of polyurethane. The wire comes from a continuous reel of wire and extends through the wire feed 5 down through the body of the head and into the opening in the tip 1.

In order to cool the wire in the body portion of the head, a supply of cooling gas is applied to the top end of the flexible tubing 6. For example, nitrogen gas flowing through the flexible tubing 6 will help prevent sublimation of the insulation on the wire except on that portion of the wire extending from the opening in the tip.

In order to further thermally insulate the body portion of the head from the tip, a piece of ceramic tubing 7 connects the tip with the body portion. Because of this, and because of the cooling, the heat is concentrated in the very end of the tip so that the insulation is sublimated substantially only on that portion of the wire extending from the opening.

Figure 2:
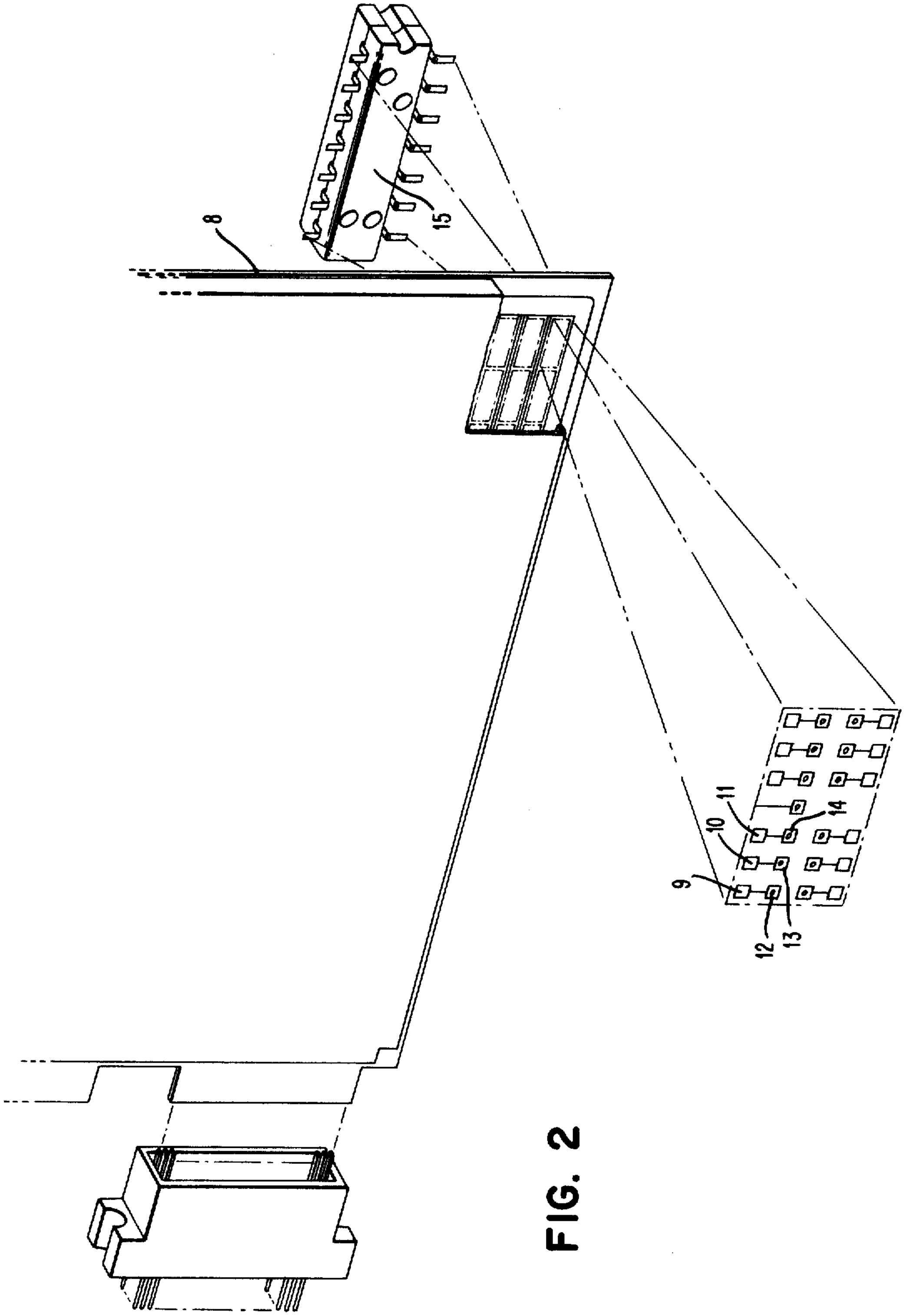
FIG. 2 shows the general arrangement of a printed circuit board.

The head of FIG. 1 is used to interwire solder pads on circuit boards of the type shown in FIG. 2. The board 8 includes groups of pads, for example, pads 9, 10 and 11. These are electrically connected to plated through holes, referred to as via holes, 12, 13 and 14. These are electrically connected to pads on the other side of the board. The components are connected to the pads on the other side of the board. The integrated circuit package 15 is typical. These are generally referred to as "flat packs" or "dip packs."

Figure 3:
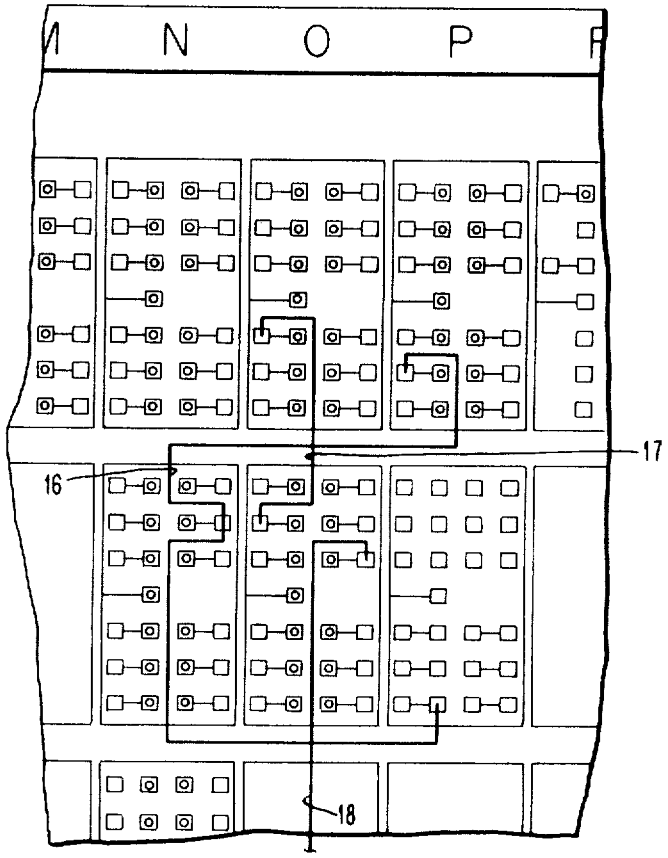
FIG. 3 shows a portion of a printed circuit board wired in accordance with the technique of the present invention.

In order to interwire the components, the technique of the present invention is used to selectively connect insulated wire to certain of the pads such as the pads 9, 10 or 11. The interwiring is better shown in FIG. 3 which shows in more detail several groups of pads on the printed circuit board. In FIG. 3, the wires 16, 17 and 18 have been shows interconnecting certain pads on the printed circuit board. Normally, of course, there will be many more wires interconnecting many of the pads on the board. However, it can be appreciated that since all of the wires are insulated, they can be crossed and recrossed with no problem.

One further feature of FIG. 3 is worthy of note. Note that the columns of pads are lettered and the rows are numbered. This greatly simplifies detailing the wiring instructions. For example, the instruction for placing wire 16 might be: "wire from pad 1 in group 2 P to pad 11 in group 2 N, then to pad 2 in group 1 P."

Figure 4:
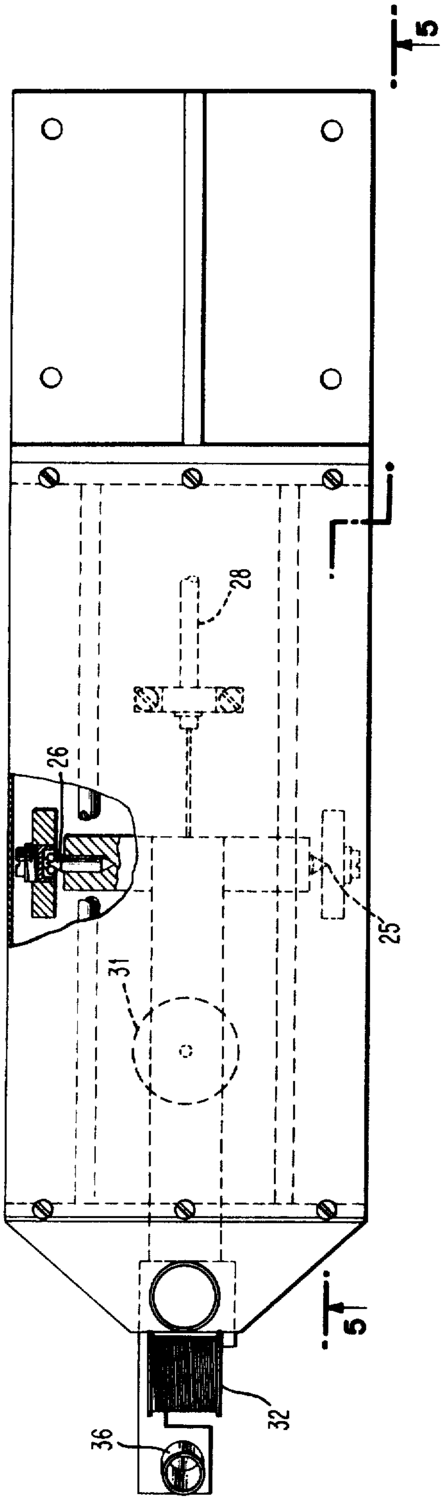
FIG. 4 shows a top view of the soldering apparatus of this invention.
Figure 5:
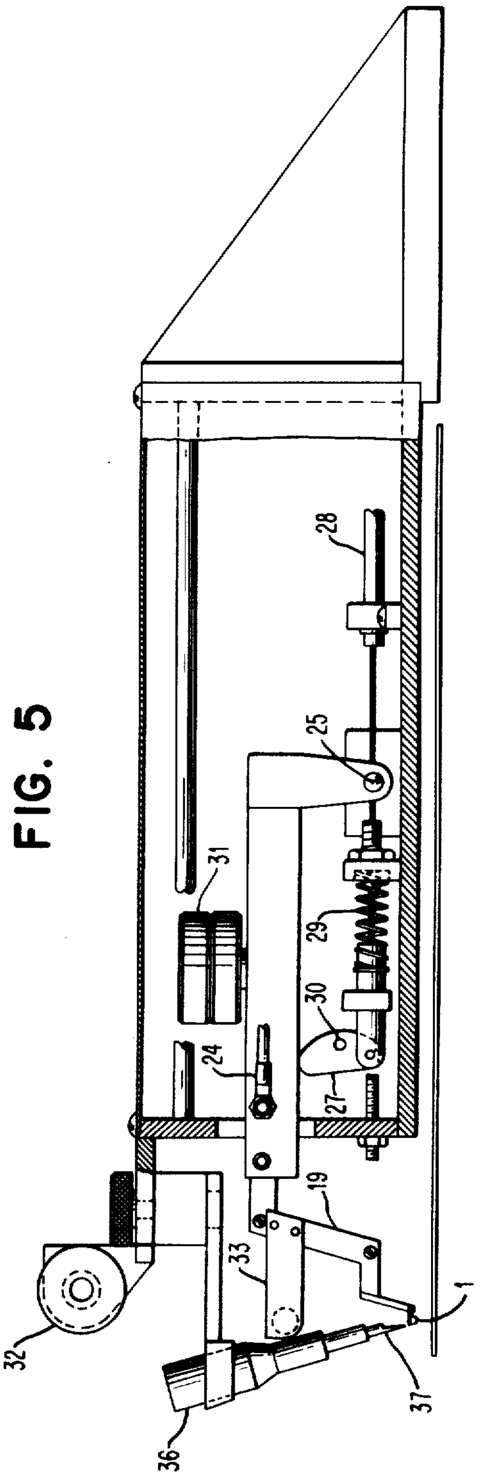
FIG. 5 shows a side sectional view of the soldering apparatus of this invention.

The apparatus for wiring in accordance with this invention includes the wiring head which embodies a soldering tip and associated components shown in FIGS. 4 and 5 together with a table on which the circuit boards are mounted. The head and the table must be movable with respect to each other tip which is mounted to the head can be moved from pad to pad and so that the tip can be moved into and out of contact with a particular pad.

In the embodiment under consideration, the table is of the type normally referred to as an XY table which moves the circuit board relative to the head for moving from pad to pad. In this embodiment, the head is movable up and down to move it into and out of contact with a particular pad. Of course, the particular manner of movement of the board with respect to the head is not critical; it is within the scope of this invention to move the head from pad to pad and/or to move the board into and out of contact with the head.

One type of manually positioned XY table which is commercially available is marketed by Universal Instruments of Binghamton, N.Y. Or, the table may be of the type which is automatically positioned from point to point. One commercially available table of the latter type is that supplied with the Slo-Syn, N/C positioning system manufactured by Superior Electric Company. Such a table is controlled from a paper tape to automatically position a point on the table beneath heads. In this type of system, a plurality of solder heads can be employed so that multiple circuit boards are wired at the same time.

Figure 6:
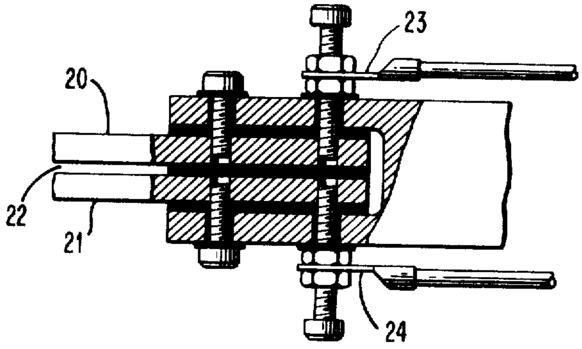
FIG. 6 shows the details of the power connection.

FIGS. 4 and 5 show the apparatus for moving the tip into contact with a particular pad, and for severing the wire at the appropriate points. Referring to FIG. 5, the soldering tip 1 is shown but the remainder of the head, shown in FIG. 1, is omitted from FIG. 5 for purposes of clarity. The solder head is mounted on the head assembly 19. The head assembly includes two conducting members 20 and 21, FIG. 6, which are insulated one from the other by the insulating strip 22. (FIG. 6 is a top view of the portion of head assembly 19 to which the electrical terminals are attached.) Electrical connections are made at 23 and 24 to supply current through the conducting members and through the tip 1 when heat is to be applied.

The entire head assembly is pivoted at 25,26. Normally, the head assembly rests upon the cam 27. When it is desired to move the tip 1 downwardly into contact with a solder pad, cable assembly 28 is moved to the right against the spring 29. The cam, pivoted at 30, rotates thereby allowing the head assembly to drop down under the force of the weight 31. This moves the tip into contact with the desired solder pad.

Figure 7:
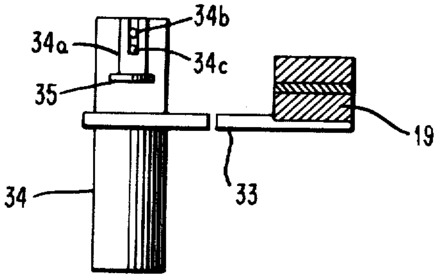
FIG. 7 shows the detail of the wire lock.

The insulated wire is wound on the supply reel 32. The wire passes through the wire lock mounted on the support 33. The support 33 is shown fastened to the head assembly 19 by two screws so it moves with the head assembly. The wire lock, details of which are shown in FIG. 7, includes a solenoid 34. (The circular outline of the solenoid 34 is shown at the extremity of support 33 in FIG. 5.) The solenoid 34 has an armature **34*a* with a slot therein. A rod 34*b* is positioned in the slot to prevent the armature from twisting. The wire extends through a hole 34*c* in the solenoid. The washer 35 is permanently affixed to the armature. When the armature is energized, the wire is trapped between the washer 35 and the flange of the armature thereby locking the wire. Of course, when the armature is unenergized, the wire passes freely through the hole 34*c***. During a cutting operation, the wire lock is actuated to break the wire as the head assembly moves backwards. This is a safety feature to make sure the wire is broken if the cutter attachment does not completely sever it.

At the last pad to be stitched to, a wire hook is formed in the wire before it is cut. In order to do this, the head is lifted and then lowered again. This forms a semi-loop in the wire which is then cut at the pad. The protruding loop insures that the wire will not slip back into the opening in the head. Also, the protruding loop of wire insures that the wire will be trapped between the head and the next pad to which the wire is to be soldered.

In order to cut the wire, a solenoid actuated wire cutter is provided. The solenoid 36, when actuated, drives the blade 37 downwardly thereby cutting the wire.

The operation of the apparatus in performing the process of this invention can be summarized as follows. The bonding tip 1 is lowered into contact against a tin lead coated pad on the circuit board mounted on the table. In so doing, the wire 4 extending through the opening in the tip 1 is trapped between the tip and the pad. The tip is pulsed with electrical current to heat the end of the tip which sublimates the polyurethane insulation on the wire. The copper wire is reflow soldered onto the pad.

The tip 1 is lifted allowing the wire to thread through it. The table, with board mounted on it, is moved until the bonding tip 1 is over the next pad to which a wire is to be attached. Again, the tip is lowered and the wire is reflow soldered into the pad. The above process is continued until all of the desired pads are stitched together. The wire is severed by the wire cutter at the end of the circuit net.

MODIFICATIONS OF THE INVENTION

Figure 8:
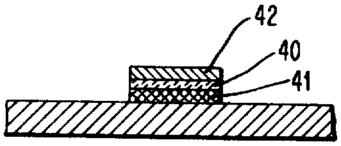
FIG. 8 is a cross section showing the thermal insulation.

Often, the thermal conduction of the copper pattern is a problem in obtaining good reflow soldering. One technique for concentrating the heat in the tin lead part of the pad where the soldering takes place is shown in FIG. 8. In this modification, a thin coating of material having thermal insulator properties, but at the same time being a good electrical conductor, is interposed between the tin lead and the copper pattern. In FIG. 8, the nickel layer 40 is interposed between the copper pattern 41 and the tin lead pad 42. It has been found that plating a few thousandths of an inch thick layer of nickel over the copper is sufficient thermal insulation to improve the reflow soldering. Further advantages of this construction are that the life of the bonding tip is lengthened since it need not be heated to as high a temperature for as long a length of time. Further, there is a limit to the temperature and the time that the laminate between the copper and epoxy board will withstand before delaminating. Since the copper pattern does not reach such a high temperature with a good thermal insulator, the delamination problem is minimized.

Another technique for reducing the heat loss during reflow soldering is to restrict the width of the conductive pattern between the pad and the via hole. In FIG. 3, note that the conductor between each pad and its associated via hole is very narrow. This limits the amount of heat absorbed by the copper pattern, and in addition all lands appear to have the same thermal resistance; i.e., require same bonding cycle.

Figure 9:
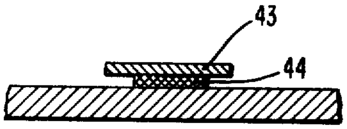
FIG. 9 shows a cross section of a solder pad before it has been reflow soldered and depicts the over-sized pad.

Referring to FIG. 9, there is shown a solder pad in which the tin lead portion 43 is larger than the copper pattern 44 beneath it. This is produced by plating tin lead onto the land pattern in a manner such that the pads produced are oversized. Then, the circuit board is over-etched. That is, the copper is etched away beneath the pad 43 to some extent. After the pad is reflow soldered, the pads return to their normal size because the solder will be drawn back to the metal. (Solder flows toward the source of heat.) The advantage of this is that it allows the operator more tolerance in positioning the flat pack on the printed circuit board, and, in addition, allows more solder to be available for covering both the copper land on the board and the flat pack or dip lead.

The apparatus and process of this invention are applicable to thermal compression bonding as well as reflow soldering. For example, gold wire can be bonded to a gold-plated substrate by applying sufficient heat to raise the gold to the softening point and thereafter applying pressure sufficient to get a good bond. As previously described, the insulation is sublimated by the application of heat. This technique is particularly useful for wiring together printed circuit chips.

It is difficult to manufacture integrated circuits in large groups of logic because of the yield problem; that is, integrated circuits can be tightly packed on a substrate but all of the individual chips will not be good because of flaws in the material and/or the diffusion process. As larger numbers of chips are grouped together to form a functional unit, the yield becomes lower and lower. In the present state of the art, it is difficult to group more than 10 or 15 circuits together at any reasonable or economical yield. The process of the present invention allows one to interwire side-by-side integrated circuits with insulated discrete wire thereby producing a large scale integrated package without consideration for the yield of a large group of circuits within one wafer.

One particular advantage of this invention is that the circuit boards can be wired first and the components thereafter attached by wave soldering.

It is frequently desirable to wire the board before components are attached thereby facilitating the testing of the connections. In accordance with this invention, the board can be wired with insulated wire. Thereafter, the wired board can be wave soldered to attach components or integrated circuit packages to the board. It has been found that the wave soldering process does not destroy the insulation on the wire nor does it disconnect the bonds at the solder pads. On the contrary, the quality of the bonds is enchanced; i.e., the solder is flowed over the wiring at the bonding point. Secondly, the board can be wired and then dip packages or other components can be attached to the other side. Thirdly, components can be inserted into the board; the board wave soldered; then the wiring applied.

While the wire has been shown threaded through the soldering tip, it is within the scope of the invention to thread the wire through an opening elsewhere in the head. For example, it might be desirable to provide a separate soldering iron mounted on, and movable with respect to, the head.

While a particular embodiment of the invention has been shown and described, it will, of course, be understood that various modifications may be made without departing from the principles of the invention. The appended claims are, therefore, intended to cover any such modifications within the true spirit and scope of the invention.

I claim:

1. The method of wiring an electrical circuit on a circuit board having solder contacts suitable for connection to circuit components comprising the steps of:

passing heat sublimable insulated wire from a supply through the passage of a bonding tip having a heat and force applying bonding surface, moving said bonding tip and said board relative to each other while maintaining the wire extending from said tip fixed with respect to said board so that the wire in the passage of the tip is drawn therethrough and the wire is then forced against the contact solder by pressure form the tip bonding surface, and solder bonding the wire to the contact by sublimating the insulation on the wire interposed between the said bonding surface and solder and contemporanseously causing the solder thereabout to melt and flow around the wire by heating the tip while concentrating said heat in the end of said tip so that the insulation is only locally sublimated.

2. The method recited in claim 1 wherein concentrating said heat in the end of said tip includes thermally insulating said tip from the body portion of a head which carries said tip.

3. The method recited in claim 1 wherein concentrating said heat in the end of said tip includes cooling the remaining portion of said wire while applying heat to the contact so that the insulation is sublimated only on that portion of the wire extending from said tip.

4. The method recited in claim 1 further comprising:

soldering components to said circuit board after said board has been wired.

* * * * *

M-258

PO-1050
(5/69)

UNITED STATES PATENT OFFICE
CERTIFICATE OF CORRECTION

Patent No. 3,673,681 Dated July 4, 1972

Inventor(s) James J. Steranko

It is certified that error appears in the above-identified patent and that said Letters Patent are hereby corrected as shown below:

Column 1, line 63, delete "insulted" and substitute therefor --insulated--;
Column 3, line 32, delete "shows" and substitute therefor --shown--;
line 48, after "with respect to each other" insert --so that the--;
Column 6, line 36, delete "form" and substitute therefor --from--;
line 40, delete "contemporanseously" and substitute therefor --contemporaneously--.

Signed and sealed this 5th day of December 1972.

(SEAL)
Attest:

EDWARD M.FLETCHER,JR.
Attesting Officer

ROBERT GOTTSCHALK
Commissioner of Patents

Disclaimer 3,673,681.—*James J. Steranko*, Weston, Mass. ELECTRICAL CIRCUIT BOARD WIRING. Patent dated July 4, 1972. Disclaimer filed Aug. 3, 1973, by the assignee, *Inforex, Inc.*

Hereby enters this disclaimer to claims 1–4 of said patent.

[*Official Gazette June 10, 1975.*]